(12) United States Patent
Hashizume et al.

(10) Patent No.: US 6,848,422 B2
(45) Date of Patent: Feb. 1, 2005

(54) CONTROL SYSTEM AND METHOD FOR INTERNAL COMBUSTION ENGINE WITH VARIABLE VALVE MECHANISM

(75) Inventors: Akira Hashizume, Susono (JP); Keizo Hiraku, Nishikamo-gun (JP); Hiroshi Kanai, Susono (JP); Yukihiro Nakasaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/656,210

(22) Filed: Sep. 8, 2003

(65) Prior Publication Data

US 2004/0055571 A1 Mar. 25, 2004

(30) Foreign Application Priority Data

Sep. 24, 2002 (JP) .......................... 2002-277581

(51) Int. Cl.[7] .................. F02D 13/02; F01L 13/00; F02P 5/152
(52) U.S. Cl. .................. 123/406.29; 123/90.15
(58) Field of Search .................. 123/90.11, 90.15, 123/90.16, 90.17, 406.29, 406.45

(56) References Cited

U.S. PATENT DOCUMENTS 6,769,404 B2 * 8/2004 Aoyama et al. ........ 123/406.29

FOREIGN PATENT DOCUMENTS

| JP | A 6-129271  | 5/1994  |
| JP | A 11-190236 | 7/1999  |
| JP | A 11-324762 | 11/1999 |

* cited by examiner

Primary Examiner—Tony M. Argenbright
(74) Attorney, Agent, or Firm—Oliff & Berridge, PLC

(57) ABSTRACT

An engine is provided with a variable valve mechanism capable of changing a degree of an operating angle and a phase of a valve-open period of an intake valve. A controller selectively executes at least one of a plurality of knock controls including a phase adjustment of the valve-open period of the intake valve when a knocking is detected by a knock sensor. When the operating angle of the intake valve is smaller than 180 degrees, a knock control is selected and executed such that a valve-open timing IVO of the intake valve does not exceed a predetermined timing (TDC+α) retarded from a top dead center TDC by a predetermined angle α. Specifically, for example, when the operating angle is smaller than 180 degrees and the valve-open timing IVO of the intake valve is after the top dead center TDC, the valve-open timing IVO is advanced.

11 Claims, 11 Drawing Sheets

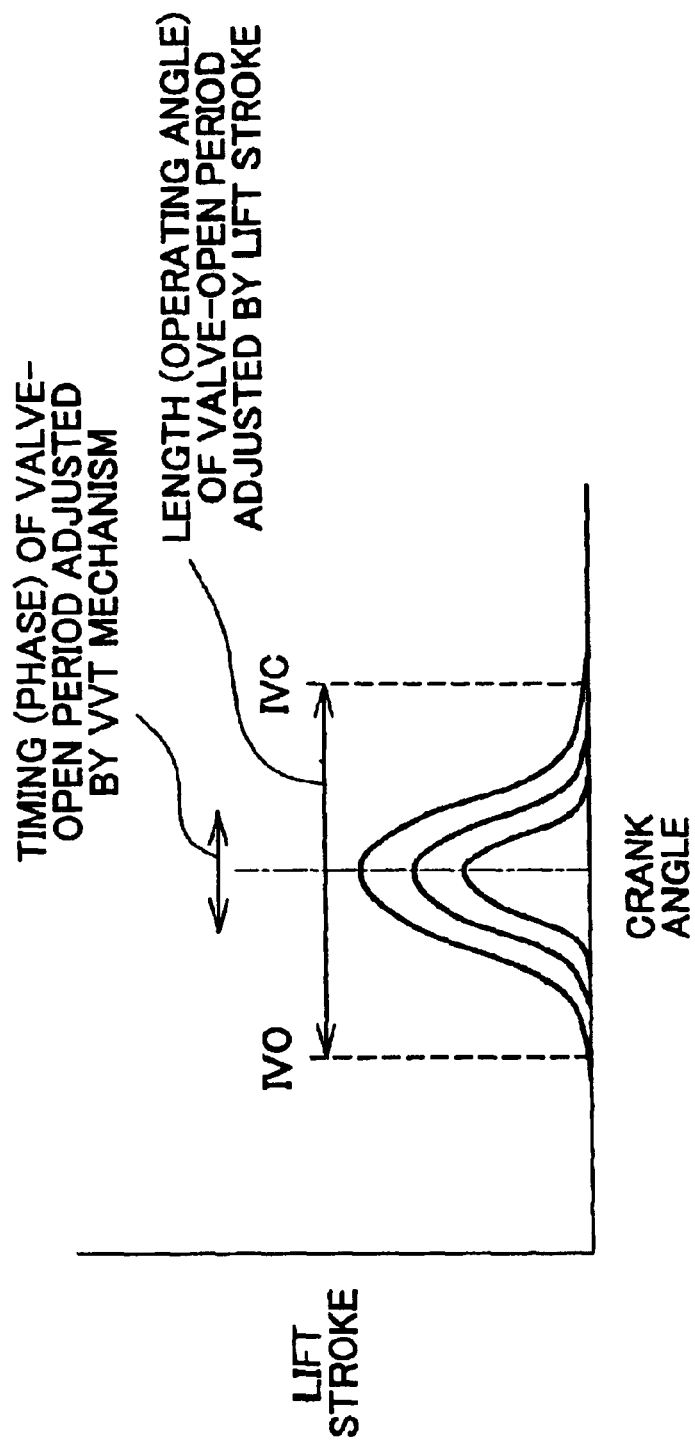

| IVO | B20 | B10 | TDC | A10 | A20 | A30 | A40 | A50 |
|---|---|---|---|---|---|---|---|---|
| ΔTo | 0 | -1 | -2 | -3 | -5 | -7 | -10 | -13 |

(NEGATIVE VALUES INDICATE TIMING RETARDING)

| IVC | B30 | B20 | B10 | BDC | A10 | A20 | A30 |
|---|---|---|---|---|---|---|---|
| ΔTc | 0 | -2 | -4 | -5 | -4 | -2 | 0 |

(NEGATIVE VALUES INDICATE TIMING RETARDING)

CONTROL SYSTEM AND METHOD FOR INTERNAL COMBUSTION ENGINE WITH VARIABLE VALVE MECHANISM

INCORPORATION BY REFERENCE

The disclosure of Japanese Patent Application No. 2002-277581 filed on Sep. 24, 2002, including the specification, drawings, and abstract is incorporated herein by reference in its entirety.

BACKGROUND OF THE INVENTION

1. Field of the Invention

The invention relates to a knock control for an internal combustion engine having a variable valve mechanism.

2. Description of the Related Art

Conventionally, various arts related to knock control for gasoline engines have been proposed. Among them, retarding an ignition timing is known as a typical control for controlling knocking. Japanese Patent Laid-opened Publication No. 11-324762 discloses an art that retards a timing of closing intake valve when a knocking occurs. Furthermore, Japanese Patent Laid-opened Publication No. 11-190236 discloses an art that, when a knocking occurs, retards or advances the phase of intake valve-open period according to the state of the knocking. Moreover, an art that changes a timing of closing an intake valve according to the degree of knocking is disclosed in Japanese Patent Laid-Open Publication No. 06-129271.

Meanwhile, there is known, as a mechanism of an intake valve, a so-called variable valve mechanism that is capable of changing both length of a valve-open period (i.e., operating angle) and a position of the valve-open period (i.e., phase of valve-open period). With such a variable valve mechanism, the volume of intake air can be reduced by reducing the operating angle, instead of narrowing down the opening of a throttle valve of an intake system, during a low-load running of the engine. As a result, a resistance of the intake system is reduced, and thus, a pump loss is reduced, thereby increasing thermal efficiency.

In fact, there have not been many improvements for a knock control in an internal combustion engine having a variable valve mechanism as described above. The operating angle of an intake valve of an ordinary internal combustion engine is usually set at 220 to 240 degrees, whereas the operating angle of an intake valve of an internal combustion engine having a variable valve mechanism may in some cases be set smaller than 180 degrees. When the operating angle of the intake valve is smaller than 180 degrees, a knock control effect obtained by advancing and retarding the phase of valve-open period significantly differs from that obtained in the case of the operating angle of 200 degrees or larger. However, as a matter of fact, not enough countermeasures have been devised against knocking in an internal combustion engine in which the operating angle may be set at an angle that is smaller than 180 degrees.

SUMMARY OF THE INVENTION

The invention has been made to solve the aforementioned problems, and it is an object of the invention to achieve increased reliability in suppressing knockings in an internal combustion engine having a variable valve mechanism.

To solve the problems mentioned above, a control system of an internal combustion engine according to a first aspect of the invention includes an intake valve; a variable valve mechanism capable of changing a degree of an operating angle and a phase of a valve-open period of the intake valve; a knock sensor for detecting an occurrence of knocking in the internal combustion engine, and a controller that is adapted to selectively execute at least one of a plurality of knock controls including a phase adjustment of the valve-open period of the intake valve when a knocking is detected by the knock sensor. The controller is adapted to perform a knock control mode in which a knock control is selected and executed such that a valve-open timing of the intake valve does not exceed a predetermined timing that is retarded from a top dead center by a predetermined angle when the operating angle of the intake valve is smaller than 180 degrees.

The inventors have found that knocking is more likely to occur as the timing of the intake valve opening is retarded from the top dead center when the operating angle of the intake valve is smaller than 180 degrees. Thus, the control system according to the first aspect of the invention is designed to select a knock control such that the timing of the intake valve opening does not exceed the predetermined timing that is retarded by the predetermined angle from the top dead center, thereby avoiding an increase in the possibility of knocking, which would otherwise be caused when the valve-open timing is retarded. Thus, the above-described control system achieves increased reliability in suppressing knockings.

In the control system according to the first aspect of the invention, it is preferable that the controller be adapted to, during the knock control mode, advance a timing of the intake valve opening when the timing of the intake valve opening is after the top dead center when a knocking occurs.

The above arrangement achieves increased reliability in suppressing knockings which may otherwise increasingly occur when the timing of intake valve opening is retarded.

In this case, the timing of intake valve opening may be advanced by advancing the phase of the valve-open period while maintaining the operating angle of the intake valve, or by increasing the operating angle of the intake valve.

Also, it is also preferable that the controller be adapted to select a knock control such that the timing of intake valve opening does not exceed the predetermined timing that is retarded from the top dead center by the predetermined angle, and the timing of the intake valve closing does not enter a predetermined range near the bottom dead center.

It is known that a knocking easily occurs when the timing of intake valve closing is near the bottom dead center. Therefore, it is possible to more effectively suppress knockings by controlling the valve-close timing, as well as the valve-open timing, such that it does not enter this predetermined range.

In the control system according to the first aspect of the invention, it is also preferable that the controller be adapted to correct an ignition timing based on a timing of opening and closing the intake valve when no knocking occurs.

When the operating angle of the intake valve is changeable, an ignition timing appropriate for suppressing knockings depends on both a timing of opening the intake valve and a timing of closing the intake valve. Accordingly, if the ignition timing is corrected based on both of these timings even when no knocking occurs, knockings may be effectively avoided.

Also, it is also preferable that the controller be adapted to set the ignition timing such that it is retarded as the timing of intake valve opening is retarded from the top dead center and the timing of intake valve closing approaches the bottom dead center.

A knocking tends to more easily occur as the timing of intake valve opening is retarded from the top dead center and the timing of intake valve closing approaches the bottom dead center. Therefore, if the ignition timing is set as described above, further reliability is achieved in suppressing knockings.

A control system according to a second aspect of the invention includes an intake valve; a variable valve mechanism capable of changing an operating angle of the intake valve and a phase of a valve-open period of the intake valve; a knock sensor for detecting a knocking in the internal combustion engine; and a controller adapted to selectively execute at least one of a plurality of knock controls including a phase adjustment of the valve-open period of the intake valve when a knocking is detected by the knock sensor. The controller is adapted to, when a knocking is detected by the knock sensor, determine the present setting condition of a valve-open timing and valve-close timing of the intake valve among four setting conditions: i) a first setting condition in which the valve-open timing of the intake valve is before a top dead center and the valve-close timing is before a bottom dead center; ii) a second setting condition in which the valve-open timing of the intake valve is after the top dead center and the valve-close timing is before the bottom dead center; iii) a third setting condition in which the valve-open timing of the intake valve is before the top dead center and the valve-close timing is after the bottom dead center; and iv) a fourth setting condition in which the valve-open timing of the intake valve is after the top dead center and the valve-close timing is after the bottom dead center, and execute a knock control that is selected beforehand for each of the four setting conditions.

An appropriate knock control differs for each of the four setting conditions described above. Therefore, it is possible to more effectively suppress knockings by setting an appropriate knock control for each of the four setting conditions beforehand, and selecting and executing a corresponding one or more of theses knock controls according to the present setting condition of the intake valve when a knocking occurs.

It is preferable that the controller be adapted to advance the timing of intake valve opening if the intake valve is in the second setting condition when a knocking is detected by the knock sensor.

In the second setting condition, since the operating angle of the intake valve is smaller than 180 degrees, knockings may be caused more increasingly as the valve-open timing is retarded. If the valve-open timing is advanced as described above, therefore, knockings can be more effectively suppressed.

A third aspect of the invention relates to a control method for an internal combustion engine with a variable valve mechanism capable of changing an operating angle of an intake valve and a phase of a valve-open period of the intake valve. The control method includes a detection step of detecting a knocking in the internal combustion engine; and a selection-execution step of selectively executing at least one of a plurality of knock controls including a phase adjustment of the valve-open period of the intake valve when a knocking is detected. In the selection-execution step, a knock control is selected and executed such that a valve-open timing of the intake valve does not exceed a predetermined timing that is retarded from a top dead center by a predetermined angle, when the operating angle of the intake valve is smaller than 180 degrees.

A fourth aspect of the invention relates to a control method for an internal combustion engine with a variable valve mechanism capable of changing an operating angle of an intake valve and a phase of a valve-open period of the intake valve. The control method includes a detection step of detecting a knocking in the internal combustion engine, and a selection-execution step of selectively executing at least one of a plurality of knock controls including a phase adjustment of the valve-open period of the intake valve when a knocking is detected. The selection-execution step includes determining, when a knocking is detected, the present setting condition of the valve-open timing and the valve-close timing of the intake valve among four setting conditions: i) a first setting condition in which a valve-open timing of the intake valve is before a top dead center and a valve-close timing is before a bottom dead center; ii) a second setting condition in which the valve-open timing of the intake valve is after the top dead center and the valve-close timing is before the bottom dead center; iii) a third setting condition in which the valve-open timing of the intake valve is before the top dead center and the valve-close timing is after the bottom dead center; and iv) a fourth setting condition in which the valve-open timing of the intake valve is after the top dead center and the valve-close timing is after the bottom dead center, and the selection-execution step further includes executing a knock control that is selected beforehand for each of the four setting conditions.

It is to be noted that the present invention is able to be achieved in various forms, including a control system and control method for an internal combustion engine, a computer program realizing the functions of such a control system and control method, a recording medium storing the computer program, and a data signal that includes the computer program and is embodied in a carrier wave, and the like.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 2 is a graph illustrating an adjustment of a timing of opening and closing an intake valve 112 via a variable valve mechanism 114;

DETAILED DESCRIPTION OF THE PREFERRED EMBODIMENTS

Hereinafter, an exemplary embodiment of the invention will be described with reference to the accompanying drawings.

System Configuration

Figure 1:
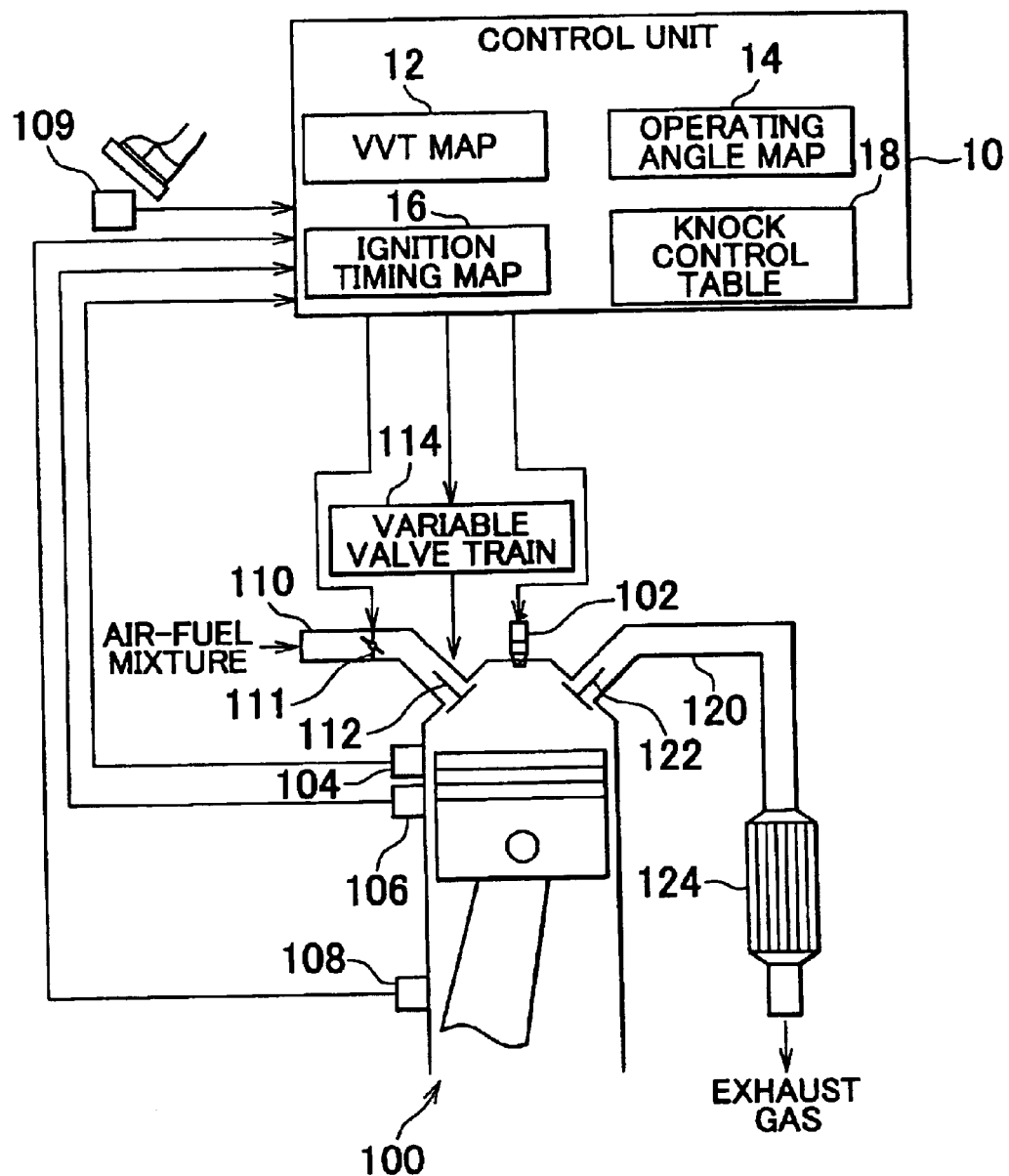
FIG. 1 is a conceptual view showing a construction of a control system according to one exemplary embodiment of the invention.

FIG. 1 shows the configuration of a control system according to one exemplary embodiment of the invention. This control system is constructed as a system for controlling a gasoline engine 100 (will simply be referred to as "engine" where appropriate) mounted on a vehicle. The engine 100 draws in a mixture of gasoline and air via an intake pipe 110, and ignites the air-fuel mixture by a spark plug 102. An exhaust gas is discharged to the outside via an exhaust pipe 120. The intake pipe 110 is provided with a throttle valve 111 for adjusting the volume of the air-fuel mixture. A fuel injection mechanism for injecting fuel into the intake pipe 110 is not shown in the drawing. Alternatively, the engine 100 may be constructed such that fuel is directly injected into the combustion chamber. The exhaust pipe 120 is provided with a catalyst 124 for removing harmful components in the exhaust gas.

An intake stroke and an exhaust stroke in the engine 100 are switched according to the open-close state of an intake valve 112 and an exhaust valve 122. The intake valve 112 is provided with a variable valve mechanism 114 for adjusting a timing of opening and closing the intake valve 112. The variable valve mechanism 114 is capable of changing the length of a valve-open period of the intake valve 112 (i.e., operating angle), and the position of the valve-open period (i.e., phase of a valve-open period, or variable valve timing (VVT) position). As such a variable valve mechanism, the one described in Japanese Patent Laid-Open Publication No. 2001-263015 can be used.

The operation of the engine 100 is controlled by a controller 10. The controller 10 is constructed as a microcomputer including a CPU, RAM, and ROM. The controller 10 is arranged to receive signals from various sensors, such as a knock sensor 104 for detecting knocking, a coolant temperature sensor 106 for detecting the temperature of engine coolant, a rotational speed sensor 108 for detecting an engine speed, and an accelerator sensor 109 for detecting an accelerator position.

The ROM of the controller 10 stores a VVT map 12 for setting a phase of the valve-open period (i.e., VVT position), an operating angle map 14 for setting an operating angle of the intake valve 112, and an ignition timing map 16 for setting an ignition timing of the spark plug 102. These maps are used in setting operation conditions of the variable valve mechanism 114 and spark plug 102 according to the engine speed, engine load, temperature of engine coolant, and the like. In the ROM of the controller 10 is further stored a knock control table 18 for determining a knock control. The controller 10 is adapted to select an appropriate one or more of knock controls by referring to the knock control table 18. This selection of knock control will be described later in detail.

FIG. 2 illustrates an adjustment of a timing of opening and closing the intake valve 112 via the variable valve mechanism 114. With this variable valve mechanism 114, the length of the valve-open period (operating angle) is adjusted by changing a lift of a valve shaft. Furthermore, a phase of the valve-open period (i.e., center of valve-open period) is adjusted using a variable valve timing mechanism (VVT mechanism) provided in the variable valve mechanism 114. Moreover, with the variable valve mechanism 114, it is possible to change the operating angle of the intake valve 112 and the phase of the valve-open period of the intake valve 112 separately. Therefore, the operating angle and the phase of the valve-open period of the intake valve 112 are set as desired, respectively, according to the operation state of the engine 100.

First Exemplary Knock Control

Figure 3A:
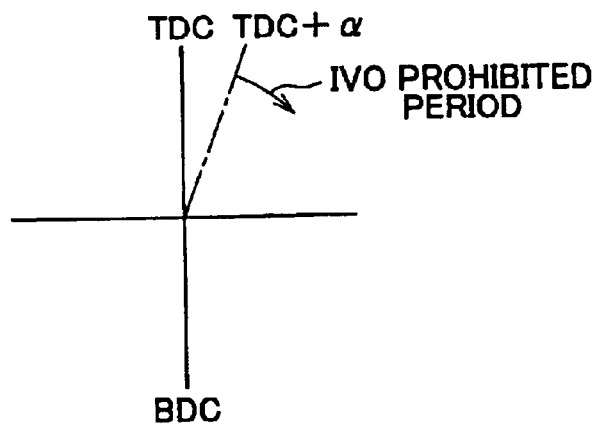
FIGS. 3A–3B are graphs illustrating a first exemplary knock control executed by the control system according to the exemplary embodiment of the invention.
Figure 3B:
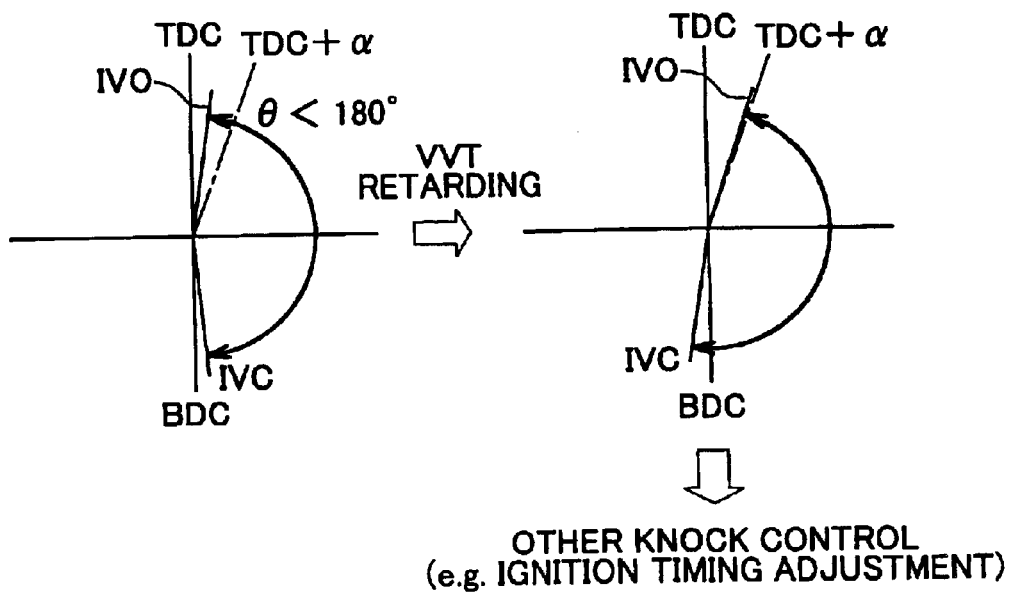

FIG. 3A illustrates a prohibited period of a valve-open timing IVO of the intake valve 112, which is adopted in a first exemplary knock control executed by the control system of the embodiment. In this knock control, it is prohibited that, during execution of the process, the valve-open timing IVO of the intake valve 112 exceeds a predetermined timing (TDC+α) that is retarded from the top dead center TDC by a predetermined angle α. Here, the angle α assumes a positive value excluding zero. The term "angle" referred to herein represents a crank angle. FIG. 3B illustrates one form of the first exemplary knock control. In this form, the operating angle θ is smaller than 180 degrees. If a knocking occurs in this state, the valve-open period of the intake valve 112 is retarded via the VVT mechanism. At this time, the operating angle θ remains unchanged. Then, if the knocking does not stop even after the valve-open timing IVO has been retarded to the vicinity of the timing (TDC+α), other knock control, such as adjustment of ignition timing and fuel injection timing, is executed.

Figure 4A:
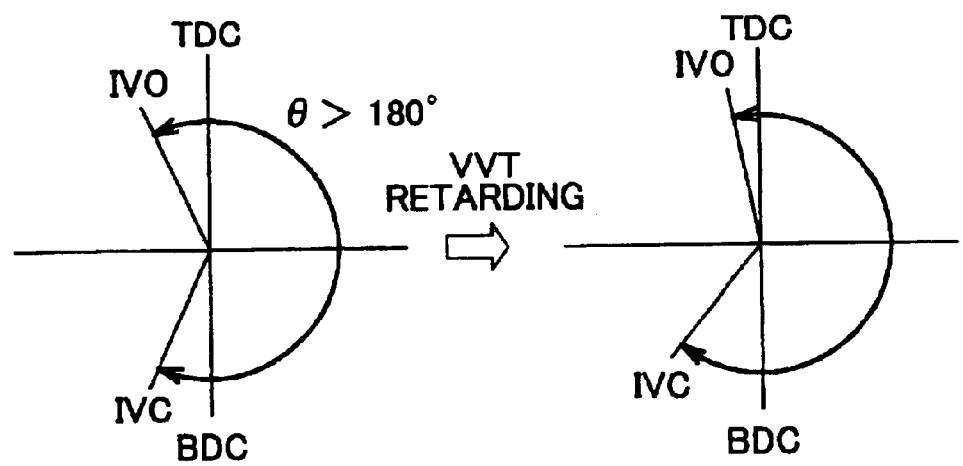
FIGS. 4A–4B are graphs illustrating VVT retarding with large and small operating angles of the intake valve 112.
Figure 4B:
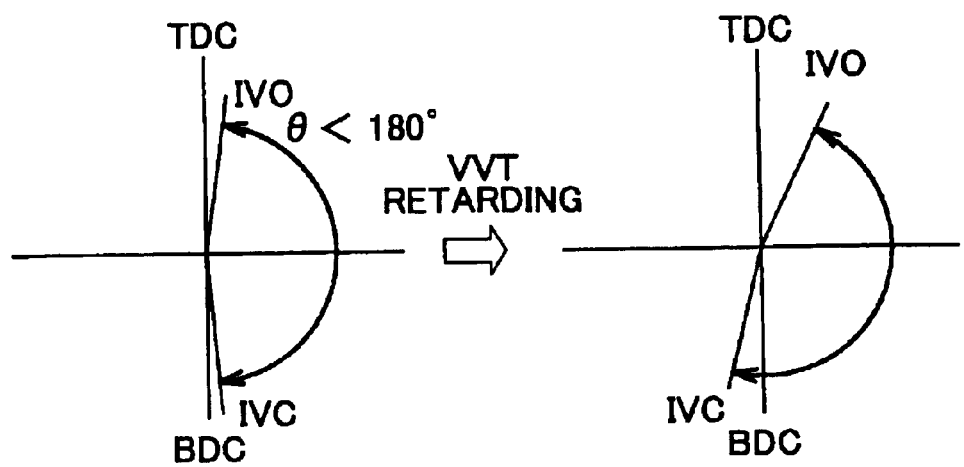

The reasons for restricting the valve-open timing IVO of the intake valve 112 as described above will be described below. FIG. 4A illustrates a state of VVT retarding when the operating angle is larger than 180 degrees, while FIG. 4B illustrates a state of VVT retarding when the operating angle is smaller than 180 degrees. Referring to FIG. 4A, when the operating angle is large (normally approximately 230 degrees), the valve-open timing IVO still remains before the top dead center TDC after VVT retarding has been performed. When the operating angle is small (i.e., smaller than 180 degrees), conversely, the valve-open timing IVO comes to a point largely retarded from the top dead center TDC when the VVT retarding is performed.

When the valve-open timing IVO is excessively retarded from the top dead center TDC with the small operating angle, this increases the possibility of a knocking as described below:

(i) A small amount of residual exhaust gas in the combustion chamber is heated by a cylinder wall until the valve-open timing IVO, which as a result increases the temperature of an air-fuel mixture in the compression stroke, causing a knocking to be more likely to occur.

(ii) As a result of retarding the valve-open timing IVO, a large part of kinetic energy of new air, when drawing it in by opening the intake valve 112, is converted into frictional heat due to throttling loss. Therefore, the temperature of air-fuel mixture in the compression stroke is increased, causing a knocking to be more likely to occur.

Moreover, in the case of the small operating angle, the valve-open period of the intake valve and that of the exhaust valve do not overlap each other, and it is therefore considered that no increase in the internal EGR effect (i.e., reduction in the combustion temperature due to residual exhaust gas) will be attained as a result of VVT retarding.

Accordingly, a knocking still tends to more easily occur when the valve-open timing IVO is excessively retarded from the top dead center TDC.

Therefore, in the first exemplary knock control, the valve-open timing IVO of the intake valve 112 is regulated so as not to exceed a point of TDC+α. Thus, when it is considered that the timing IVO will exceed the point of TDC+α if VVT retarding is performed, other knock control except than VVT retarding is then executed. In this process, although the angle α that defines the prohibited period of the valve-open timing IVO may be a fixed value, it is preferable that different values be preset as the angle α corresponding to various operation conditions of the engine 100, such as engine speed, engine load, and coolant temperature.

Figure 5:
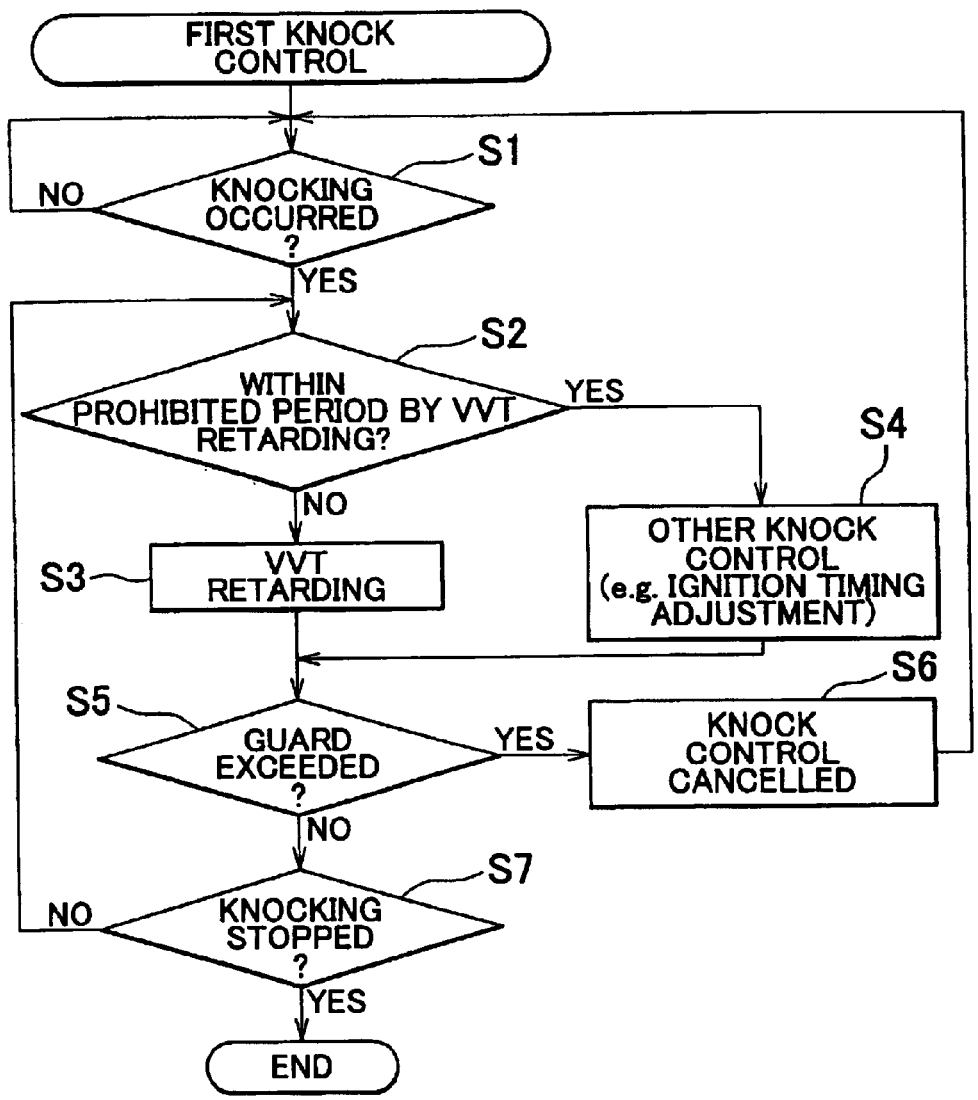
FIG. 5 is a flowchart illustrating the first exemplary knock control.

FIG. 5 is a flowchart illustrating the procedure of the first exemplary knock control. Referring to FIG. 5, the controller 10 first determines whether a knocking has occurred based on an output signal from the knock sensor 104 (Step S1). If it is determined in this step that a knocking has occurred, the controller 10 then determines whether the valve-open timing IVO of the intake valve 112 will enter the prohibited period (i.e., period starting from TDC+α) if VVT retarding is performed (Step S2). If it is determined that the valve-open timing IVO will not enter the prohibited period, VVT retarding is then performed while maintaining the operating angle (Step S3) at the same angle. In contrast, if it is determined that the valve-open timing IVO will enter the prohibited period if VVT retarding is performed, other knock control (e.g., ignition timing adjustment), rather than VVT retarding, is executed (Step S4). However, if it is determined that guard values preset for the VVT position and the ignition timing will be reached or exceeded as a result of executing the knock control, the knock control is then cancelled (Steps S5 and S6). This restriction with guard values is mainly for preventing engine misfires. When it is determined that knocking stops (Step S7), the knock control shown in FIG. 5 ends. Conversely, if it is determined that the knocking has not yet stopped, the ECU 10 returns to Step S2 to repeat the processes from Steps S2 to S7.

As described above, in the first exemplary knock control, the timing of the intake valve 112 is regulated such that the valve-open timing IVO of the intake valve 112 does not exceed the point of TDC+α when the knock control is executed, thus preventing an adverse result that a knocking more easily occurs a result of the knock control. This regulation of the timing is particularly effective when the operating angle of the intake valve 112 is smaller than 180 degrees. Such regulation of the timing, however, is also effective when the operating angle of the intake valve 112 is set at 180 degrees or larger.

Second Exemplary Knock Control

Figure 6A:
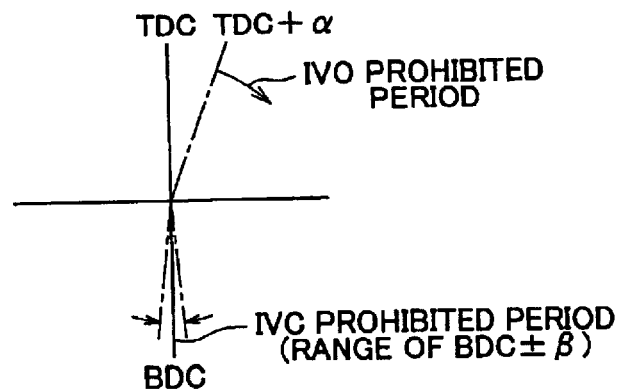
FIGS. 6A–6C are graphs illustrating a second exemplary knock control executed by the control system according to the exemplary embodiment of the invention.
Figure 6B:
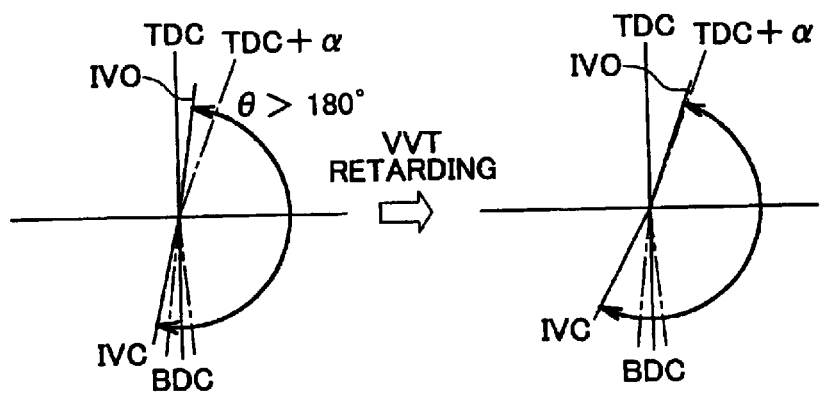

FIG. 6A and FIG. 6B illustrate a prohibited period of the valve-open timing IVO of the intake valve 112 and a prohibited period of the valve-close timing IVC of the intake valve 112, which are adapted in a second exemplary knock control executed by the control system of the embodiment. In this process, the prohibited period of the valve-close timing IVC is used in addition to the prohibited period of the valve-open timing IVO explained in the first exemplary knock control. The prohibited period of the valve-close timing IVC is a predetermined range (BDC±β) near the bottom dead center BDC. In this case, the angle β assumes a positive value except zero. The angle β may be set to a fixed value, but it is preferable that different values be preset as the angle β corresponding to various operation conditions of the engine 100, such as engine speed, engine load, and coolant temperature.

When the valve-close timing IVC of the intake valve 112 comes extremely close to the bottom dead center BDC, an actual compression ratio increases, thus creating a state where a knocking can more easily occur. Therefore, in the second exemplary knock control, the prohibited period for the valve-close timing IVC is additionally used so as to suppress knockings more effectively. In the case of the small operating angle (i.e., 180 degrees or smaller), it has been made clear that knockings is much more effectively suppressed when the prohibited period of the valve-open timing IVO of the intake valve 112 is set than when the prohibited period of the valve-close timing IVC is set. Thus, it is considered that a great effect of suppressing knockings can be achieved even if only the prohibited period of the valve-open timing IVO is set as in the first exemplary knock control described above, and it is preferable that the prohibited period for the valve-close timing IVC be additionally set.

FIG. 6B illustrates a control process executed when the operating angle θ is larger than 180 degrees. When a knocking occurs in this state, VVT retarding is performed while maintaining the operating angle θ at the same angle. Then, if the knocking does not stop even after the valve-open timing IVO has been retarded to the vicinity of TDC+α, other knock control (e.g., retarding of ignition timing) is then carried out.

Figure 6C:
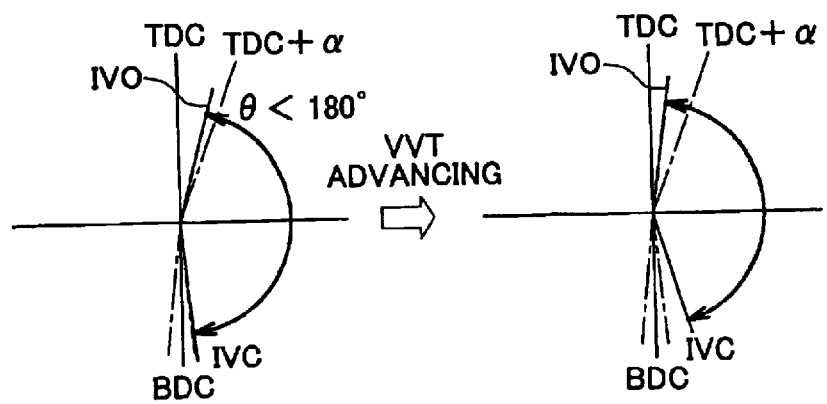

Likewise, FIG. 6C illustrates a control process that is executed when the operating angle θ is smaller than 180 degrees. When a knocking occurs in this state, VVT advancing, rather than VVT retarding, is carried out such that the valve-open timing IVO and valve-close timing IVC do not enter the respective prohibited periods. Furthermore, if the knocking does not stop even after a certain degree of the VVT advancing, other knock control (e.g., retarding of ignition timing) is then executed. As in this case, when performing VVT advancing, instead of VVT retarding, when the operating angle θ is smaller than 180 degrees, it reliably prevents a state where a knocking can more easily occur as a result of retarding the valve-open timing IVO. Accordingly, in terms of the reliability in suppressing knockings, the second exemplary knock control shown in FIG. 6C is considered to be more desirable than the first exemplary knock control shown in FIG. 3B.

Figure 7:
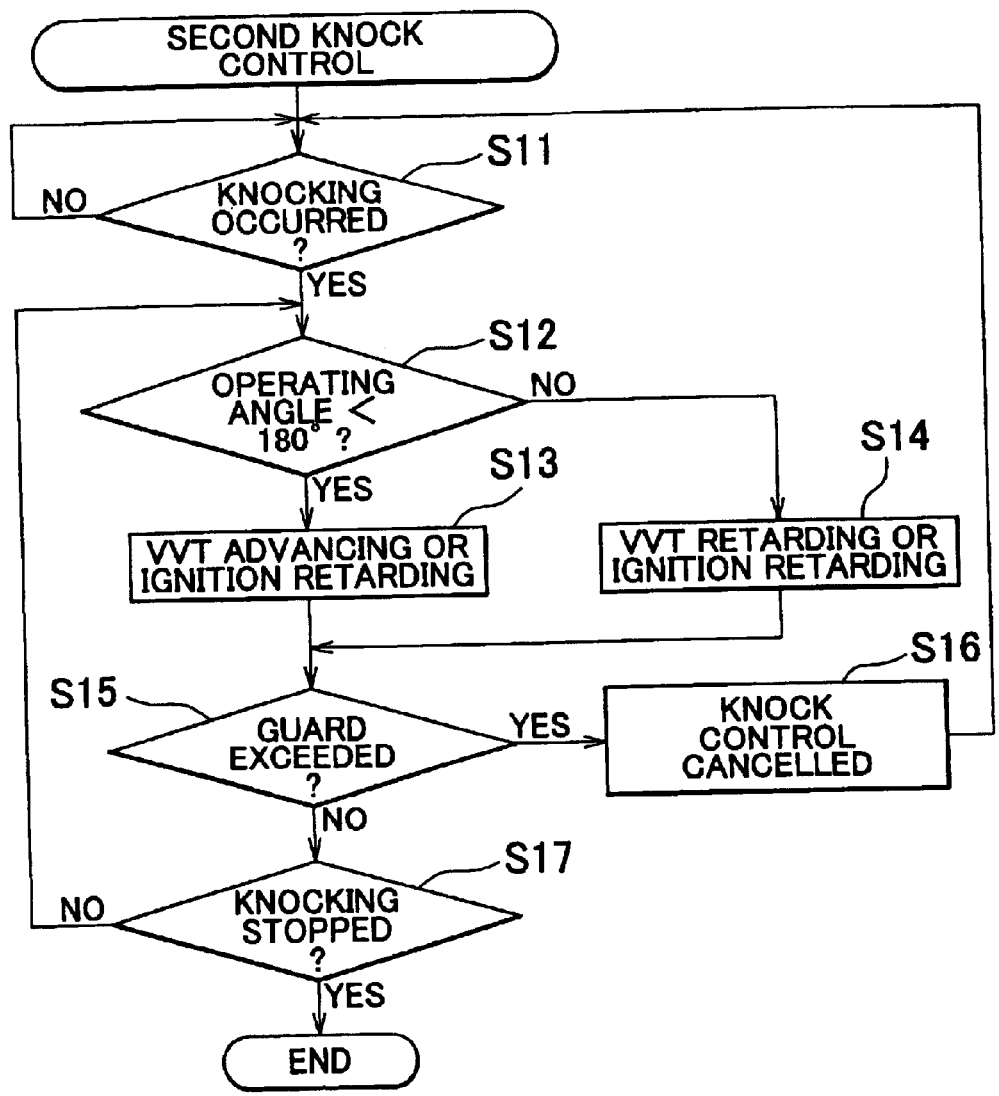
FIG. 7 is a flowchart illustrating the second exemplary knock control.

FIG. 7 is a flowchart illustrating the procedure of the second exemplary knock control. Referring to FIG. 7, the controller 10 first determines whether the operating angle of the intake valve 112 is smaller than 180 degrees (i.e., whether the small operating angle or large operating angle is presently set) when it is determined that a knocking has occurred (Steps S11 and S12). In the case of the small operating angle, VVT advancing or ignition timing retarding is performed (Step S13). In the case of the large operating angle, conversely, VVT retarding or ignition timing retarding is performed (Step S14). Steps S15 to S17 are the same as Steps S5 to S7 in FIG. 5, so explanations thereof will be omitted.

As described above, in the second exemplary knock control, selection of the knock controls is made so as to regulate the operation timing of the intake valve 112 such that the valve-open timing IVO of the intake valve 112 does not exceed the point of TDC+α and the valve-close timing IVC does not enter the range of BDC±β. By doing so, an adverse result that a knocking more easily occurs as a result of executing the knock control can be more effectively avoided.

Third Exemplary Knock Control

Figure 8A:
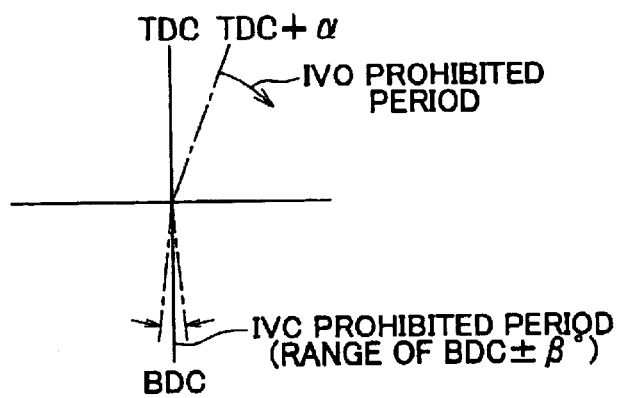
FIGS. 8A–8C are graphs illustrating a third exemplary knock control executed by the control system according to the embodiment of the invention.
Figure 8B:
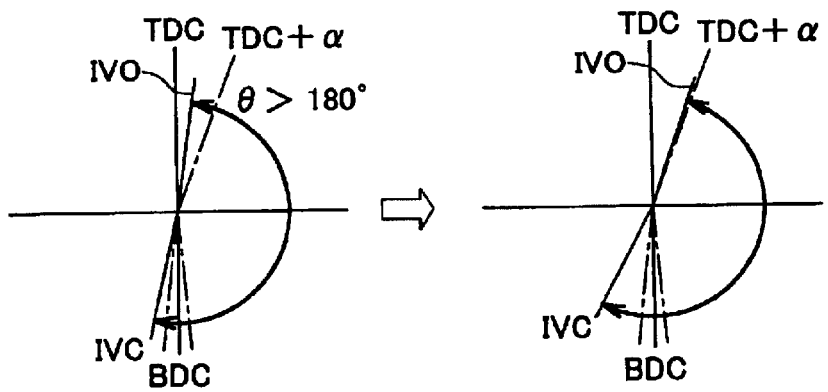

FIG. 8 illustrates a third exemplary knock control executed by the control system of the embodiment. FIGS.

Figure 8C:
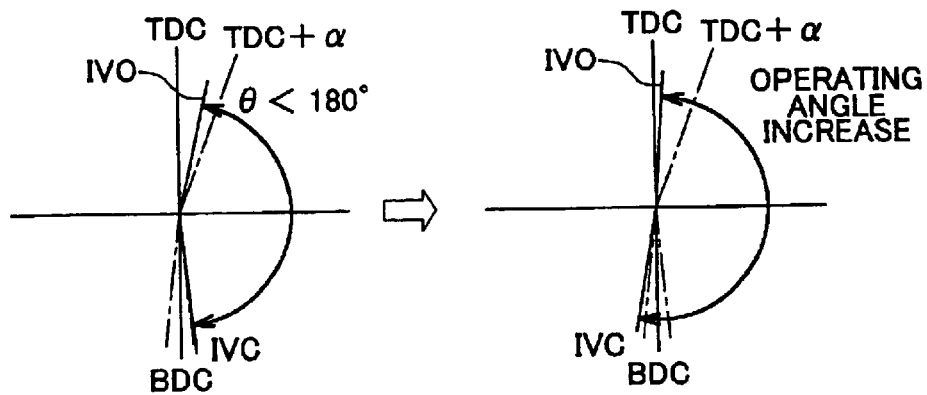

8A and 8B are the same as FIGS. 6A and 6B for the second exemplary knock control. Referring to FIG. 8C, in this process, when the operating angle is the small angle, the valve-open timing IVO is advanced by increasing the operating angle. In this case, the valve-open timing IVO and the valve-close timing IVC may be set such that both timings do not enter the respective prohibited periods. Furthermore, the operating angle is preferably allowed to be 180 degrees or larger when the operating angle is thus increased. If the knocking does not stop in spite that the operating angle has been increased to a certain degree, other knock control (e.g., ignition timing adjustment) is executed.

Figure 9:
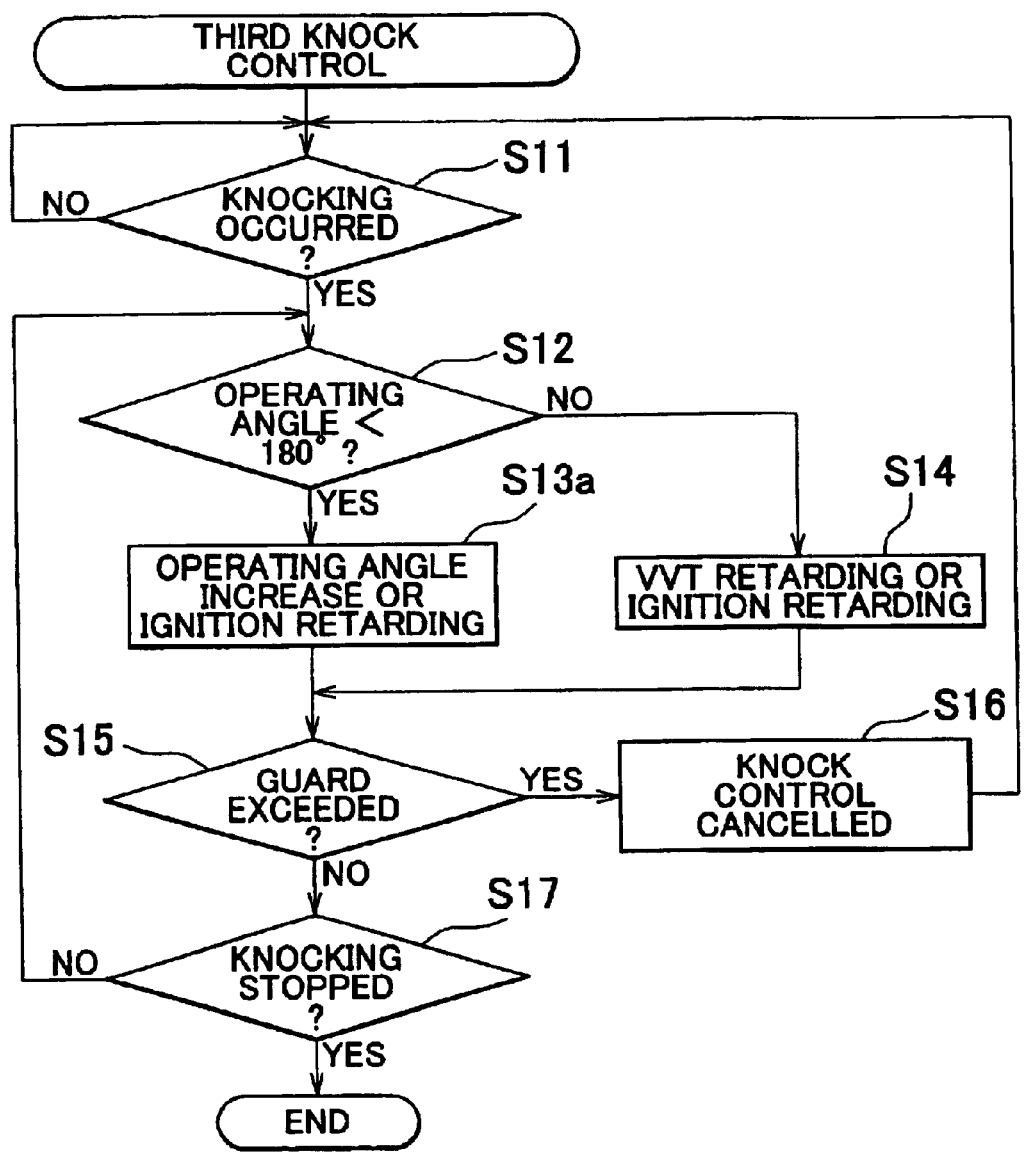
FIG. 9 is a flowchart illustrating the third exemplary knock control.

FIG. 9 is a flowchart illustrating the procedure of the third exemplary knock control. The process consists of the same steps as those shown in FIG. 7, except that Step S13 in FIG. 7 is replaced by Step S13a. If it is determined that a knocking has occurred with the operating angle of the intake valve 112 set at the small angle, the operating angle is increased and/or the ignition timing is retarded to suppress further knockings. In this case, a guard value for restricting the operating angle may be used in Step S15.

As described above, in the third example, since the operating angle of the intake valve 112 is increased as needed, the valve-open period can be adjusted easily such that the valve-open timing IVO and the valve-close timing IVC do not enter the respective prohibited periods. Thus, the third exemplary knock control offers an advantage of further increased efficiency in suppressing knockings.

Fourth Exemplary Knock Control

Figure 10:
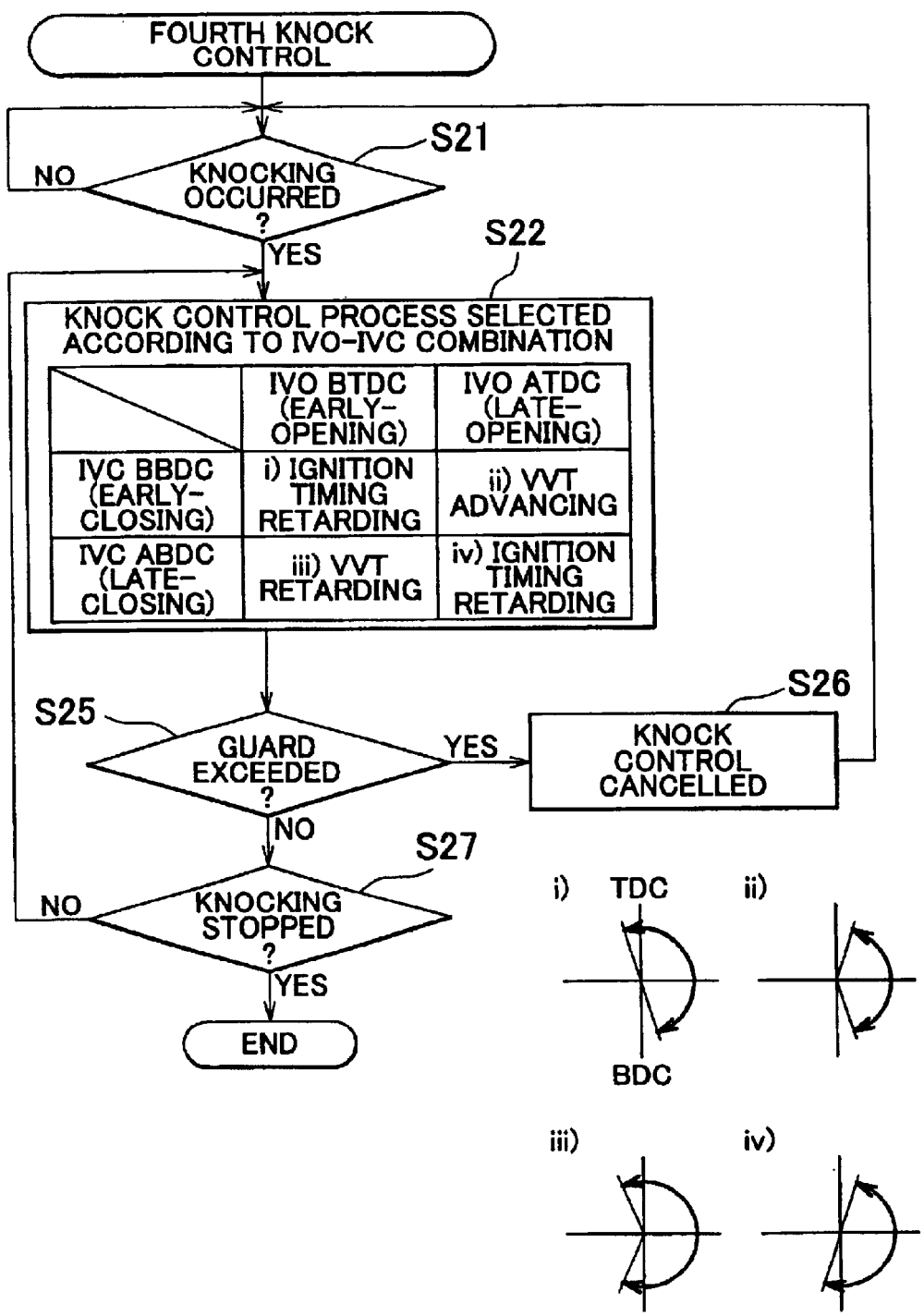
FIG. 10 is a flowchart illustrating a fourth exemplary knock control executed by the control system according to the embodiment of the invention.

FIG. 10 is a flowchart illustrating a fourth exemplary knock control that is executed by the control system of the embodiment. Steps S21 and S25 to S27 are the same as Step S1 and S5 to S7 in FIG. 5. In this control, when it is determined that a knocking has occurred, knock control processes described below are performed according to four combinations (will be denoted first to fourth setting conditions) of a position of the valve-open timing IVO and a position of the valve-close timing IVC of the intake valve 112 (Step S22).

i) In a "first setting condition" where the valve-open timing IVO is before the top dead center TDC, and the valve-close timing IVC is before the bottom dead center BDC, ignition timing retarding is carried out. ii) In a "second setting condition" where the valve-open timing IVO is after the top dead center TDC, and the valve-close timing IVC is before the bottom dead center BDC), VVT advancing is carried out. iii) In a "third setting condition" where the valve-open timing IVO is before the top dead center TDC, and the valve-close timing IVC is after the bottom dead center BDC, VVT retarding is carried out. iv) In a "fourth setting condition" where the valve-open timing IVO is after the top dead center TDC, and the valve-close timing IVC is after the bottom dead center BDC, ignition timing retarding is carried out.

The four setting conditions i) to iv) above are illustrated in the bottom right area of FIG. 10. In the second setting condition ii), the operating angle is kept smaller than 180 degrees. Therefore, the valve-open timing IVO and the valve-close timing IVC are controlled such that they do not enter the respective prohibited periods shown in FIG. 6A by VVT advancing when a knocking has occurred in the second setting condition ii). This control process is the same as that shown in FIG. 6C. Instead of executing this control process, the operating angle may be increased as indicated in FIG. 8C to advance the valve-open timing IVO.

The operating angle may be smaller than 180 degrees in the first and fourth setting conditions i) and iv). Therefore, the ignition timing is retarded without performing the VVT control in the first and fourth setting conditions i) and iv) so as to prevent the valve-open timing IVO and the valve-close timing IVC from entering the respective prohibited periods. Furthermore, since the operating angle is always 180 degrees or larger in the third setting condition iii), the VVT retarding is performed to suppress further knockings.

As described above, an appropriate knock control process is selected in advance according to each of the four combinations of the position of the valve-open timing IVO and that of the valve-close timing IVC of the intake valve 112, namely an appropriate knock control process can be selectively executed according to the setting condition of the valve-open period of the intake valve 112.

The knock control processes corresponding to the four setting conditions i) to iv) explained above are just examples, and therefore, other various knock controls may be adopted if appropriate. However, of the knock control processes for the four setting conditions i) to iv), the knock control process for at least one setting condition is preferably different from those for the other setting conditions. Particularly, different knock control processes are preferably selected for the second setting condition ii) in which the operating angle is always the small operating angle and the third setting condition iii) in which the operating angle is always the large operating angle.

Fifth Exemplary Knock Control

Figures 11A, 11B, 11C:
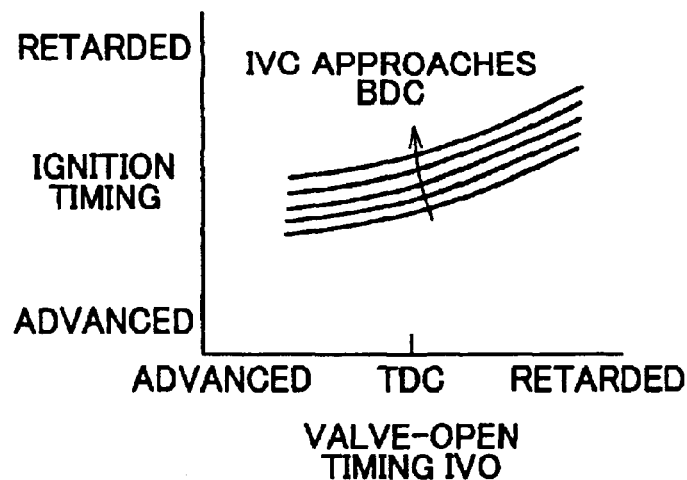
FIGS 11A–11C are graphs and tables for illustrating a fifth exemplary knock control executed by the control system according to the exemplary embodiment of the invention.

FIG. 11 is a graph illustrating a fifth exemplary knock control executed by the control system of the embodiment. In this control, the ignition timing of the spark plug 102 is adjusted beforehand in order to prevent knockings. That is, referring to FIG. 11A, the ignition timing is delayed as the valve-open timing IVO of the intake valve 112 is retarded, and as the valve-close timing IVC approaches the bottom dead center BDC.

FIGS. 11B and 11C are exemplary tables used for determining an adjustment amount Δ To of the ignition timing according to the valve-open timing IVO, and an adjustment amount Δ Tc of the ignition timing according to the valve-close timing IVC, respectively. In FIG. 11B, B10 indicates that the valve-open timing IVO is 10 degrees before the top dead center TDC, and A10 indicates that the valve-open timing IVO is 10 degrees after the top dead center TDC. Likewise, in FIG. 11C, B10 indicates that the valve-close timing IVC is 10 degrees before the bottom dead center BDC, and A10 indicates that the valve-close timing IVC is 10 degrees after the bottom dead center BDC. Furthermore, negative values of the adjustment amount Δ To and Δ Tc indicate that the ignition timing is retarded.

An actual ignition timing Tig is determined by the following equation, for instance.

$$Tig = Tbase + \Delta To + \Delta Tc + \Delta Tkcs + \Delta Tother$$

In this equation, Tbase is a basic ignition timing determined according to the engine speed and engine load, and Δ Tkcs is an ignition timing adjustment amount determined as a knock control value of this knock control. Δ T other is an ignition timing adjustment amount based on other factors, and is determined depending on engine coolant temperature, intake air temperature, and the like.

The purpose of changing the ignition timing according to the valve-open timing IVO and the valve-close timing IVC of the intake valve 112 as described above is to set an appropriate ignition timing for reducing the possibility of knocking when the degree of the operating angle is able to be changed via the variable valve mechanism 114. Conventionally, an ignition timing is set by correcting a basic ignition timing, which is determined according to the engine speed and engine load, based on the phase of the valve-open period (VVT position) of the intake valve. However, in the case of an engine capable of variably changing the operating angle of an intake valve, if the operating angle is changed, the valve-open timing IVO and the valve-close timing IVC significantly change even if the VVT positions are not changed. Accordingly, with the intake valve 112 whose operating angle is variable, it is difficult to set the ignition timing Tig to an appropriate value by simply performing the correction based on the VVT position. On the contrary, as shown in FIG. 11, if the ignition timing is corrected based on the valve-open timing IVO and the valve-close timing IVC of the intake valve 112, an ignition timing appropriate for reducing the possibility of knockings can be set even if the operating angle of the intake valve 112 changes.

MODIFICATIONS

The invention is not limited to the aforementioned embodiments and examples, and thus can be achieved in various form, including the following modifications, within a scope of the subject of the invention.

Modification 1

The four exemplary knock controls have been described above: adjusting the phase of the valve-open period of the intake valve; increasing the operating angle; adjusting the ignition timing; and adjusting the fuel injection timing. However, the present invention is applicable to a case in which a plurality of knock controls including the phase adjustment of the valve-open period of the intake valve are used.

Modification 2

The invention is also applicable to a control of an in-cylinder temperature of diesel engines, as well as the knock control of the gasoline engines.

What is claimed is:

1. A control system for an internal combustion engine, comprising:
an intake valve;
a variable valve mechanism capable of changing a degree of an operating angle and a phase of a valve-open period of the intake valve;
a knock sensor for detecting a knocking in the internal combustion engine, and
a controller that selectively executes at least one of a plurality of knock controls including a phase adjustment of the valve-open period of the intake valve when a knocking is detected by the knock sensor,
wherein the controller is adapted to perform a knock control mode in which a knock control is selected and executed such that a valve-open timing of the intake valve does not exceed a predetermined timing that is retarded from a top dead center by a predetermined angle when the operating angle of the intake valve is smaller than 180 degrees.

2. The control system according to claim 1, wherein the controller is adapted to, during the knock control mode, advance the valve-open timing of the intake valve if the valve-open timing of the intake valve is after the top dead center when a knocking occurs.

3. The control system according to claim 2, wherein the controller is adapted to advance the valve-open timing of the intake valve by advancing the phase of the valve-open period while maintaining the operating angle of the intake valve.

4. The control system according to claim 2, wherein the controller is adapted to advance the valve-open timing of the intake valve by increasing the operating angle of the intake valve.

5. The control system according to claim 1, wherein the controller is adapted to, during the knock control mode, select a knock control such that the valve-open timing of the intake valve does not exceed the predetermined timing that is retarded from the top dead center by the predetermined angle, and a valve-close timing of the intake valve does not enter a predetermined range near a bottom dead center.

6. The control system according to claim 1, wherein the controller is adapted to correct an ignition timing based on the valve-open timing and the valve-close timing of the intake valve when no knocking occurs.

7. The control system according to claim 6, wherein the controller is adapted to retard the ignition timing as the valve-open timing of the intake valve is retarded from the top dead center, and the valve-close timing of the intake valve approaches the bottom dead center.

8. A control system for an internal combustion engine, comprising:
an intake valve;
a variable valve mechanism capable of changing an operating angle of the intake valve and a phase of a valve-open period of the intake valve;
a knock sensor for detecting a knocking in the internal combustion engine; and
a controller that selectively executes at least one of a plurality of knock controls including a phase adjustment of the valve-open period of the intake valve when a knocking is detected by the knock sensor,
wherein the controller is adapted to, when a knocking is detected by the knock sensor, determine the present setting condition of a valve-open timing and valve-close timing of the intake valve among four setting conditions: i) a first setting condition in which the valve-open timing of the intake valve is before a top dead center and the valve-close timing is before a bottom dead center; ii) a second setting condition in which the valve-open timing of the intake valve is after the top dead center and the valve-close timing is before the bottom dead center; iii) a third setting condition in which the valve-open timing of the intake valve is before the top dead center and the valve-close timing is after the bottom dead center; and iv) a fourth setting condition in which the valve-open timing of the intake valve is after the top dead center and the valve-close timing is after the bottom dead center, and execute a knock control that is selected beforehand for each of the four setting conditions.

9. The control system according to claim 8, wherein the controller is adapted to advance the valve-open timing of the intake valve if the intake valve is in the second setting condition when a knocking is detected by the knock sensor.

10. A control method for an internal combustion engine with a variable valve mechanism capable of changing an operating angle of an intake valve and a phase of a valve-open period of the intake valve, the control method being characterized by comprising:

a detection step of detecting a knocking in the internal combustion engine; and a selection-execution step of selectively executing at least one of a plurality of knock controls including a phase adjustment of the valve-open period of the intake valve when a knocking is detected, wherein in the selection-execution step a knock control is selected and executed such that a valve-open timing of the intake valve does not exceed a predetermined timing that is retarded from a top dead center by a predetermined angle, when the operating angle of the intake valve is smaller than 180 degrees.

11. A control method of controlling an internal combustion engine with a variable valve mechanism capable of changing an operating angle of an intake valve and a phase of a valve-open period of the intake valve, the control method being characterized by comprising:

a detection step of detecting a knocking in the internal combustion engine, and a selection-execution step of selectively executing at least one of a plurality of knock controls including a phase adjustment of the valve-open period of the intake valve when a knocking is detected, wherein the selection-execution step includes determining, when a knocking is detected, the present setting condition of the valve-open timing and the valve-close timing of the intake valve among four setting conditions: i) a first setting condition in which a valve-open timing of the intake valve is before a top dead center and a valve-close timing is before a bottom dead center; ii) a second setting condition in which the valve-open timing of the intake valve is after the top dead center and the valve-close timing is before the bottom dead center; iii) a third setting condition in which the valve-open timing of the intake valve is before the top dead center and the valve-close timing is after the bottom dead center; and iv) a fourth setting condition in which the valve-open timing of the intake valve is after the top dead center and the valve-close timing is after the bottom dead center, and the selection-execution step further includes executing a knock control that is selected beforehand for each of the four setting conditions.

\* \* \* \* \*